United States Patent [19]

Kappers et al.

[11] Patent Number: 5,060,425
[45] Date of Patent: Oct. 29, 1991

[54] HEAD WALL FOR HOSPITAL BED

[75] Inventors: Timothy A. Kappers, Cincinnati, Ohio; Steven R. Westerfeld, Batesville, Ind.; Dennis J. Gallant, Harrison, Ohio

[73] Assignee: Hill-Rom Company, Inc., Batesville, Ind.

[21] Appl. No.: 508,930

[22] Filed: Apr. 12, 1990

Related U.S. Application Data

[63] Continuation-in-part of Ser. No. 443,432, Nov. 30, 1989, which is a continuation of Ser. No. 267,387, Nov. 4, 1988, which is a continuation of Ser. No. 208,380, Jun. 17, 1988, Pat. No. 4,821,470.

[51] Int. Cl.[5] .......................... E06B 9/15; H02G 3/10
[52] U.S. Cl. .......................................... 52/36; 52/27; 52/221; 312/297
[58] Field of Search ...................... 52/27, 28, 36, 220, 52/221; 312/209, 297, 223

[56] References Cited

U.S. PATENT DOCUMENTS

| | | | |
|---|---|---|---|
| 3,660,591 | 5/1972 | Schultz et al. | 52/36 |
| 3,769,502 | 10/1973 | Schultz et al. | 52/28 |
| 4,338,485 | 7/1982 | Fullenkamp et al. | 174/48 |
| 4,646,211 | 2/1987 | Gallant et al. | 174/49 |
| 4,753,055 | 6/1988 | Durham, Jr. | 52/36 |

OTHER PUBLICATIONS

Modular Medical Walls: 22 pages, Square D Company 1979.

Primary Examiner—Michael Safavi
Attorney, Agent, or Firm—Wood, Herron & Evans

[57] ABSTRACT

A clutter-eliminating head wall for a hospital bed has two horizontally-spaced modules with services and service outlets mounted in the modules. The recess between the modules is covered by a removable panel. The modules are covered by sliding tambour doors that slide behind the center panel to provide access to the modules. A third module covered by sliding tambour doors houses medical services and service outlets may be used alone or in combination with the larger module.

11 Claims, 6 Drawing Sheets

HEAD WALL FOR HOSPITAL BED

This is a continuation-in-part of application Ser. No. 07/443,432, filed Nov. 30, 1989, which in turn is a continuation of application Ser. No. 07/267,387, filed Nov. 4, 1988, which was a continuation of Ser. No. 07/208,380, filed June 17, 1988, now U.S. Pat. No. 4,821,470.

This invention relates to a head wall for the providing of gas and electrical assistance as well as other services to a hospital room adjacent a patient's bed. The invention relates particularly to providing such services in rooms intended for patients with low to medium medical acuity.

Efforts have been made to improve the aesthetics of the hospital room normally employed with patients with low to medium medical acuity. Rooms such as medical/surgical hospital rooms, birthing rooms, VIP suites and the like are so employed. The aesthetics of the critical care rooms is not so important, for there the patients usually do not have an awareness of their surroundings. Notwithstanding efforts to improve the aesthetics of hospital rooms, even the best of hospital rooms look clinical with the service outlets and other facilities accessible all around the bed. These elements have to be accessible and there has not been a good way of concealing them while still providing their ready accessibility.

There has been considerable recognition of the fact that the mental attitude of a patient significantly affects the speed of a patient's recovery. To place a patient in a room that, to a patient's eyes, looks sterile and threatening has a demoralizing effect on the patient and is thus detrimental to the curing process. On the other hand, if the patient is brought to a room that has the pleasant appearance of a hotel room with no apparent medical service equipment exposed, a patient is more likely to be impressed with the fact that the patient is really well, thereby creating a mental attitude conducive to recovery.

So, for a variety of reasons, it is desired to conceal or at least make unobtrusive the services and service connections that necessarily must go into a medical/surgical room. Such services and service connections, include:

1. Locations for medical gases—three on each side of the bed.
2. Standard and emergency electrical outlets.
3. The location for a nurse call.
4. An aneroid or mercury blood pressure gas with built-in cuff storage.
5. Built-in IV hook for each side of the bed.
6. Built-in swing-out bottle slide for each side of the bed.
7. Indirect lighting for the room.
8. A reading light with a safety bed kill switching feature.
9. Remote switch for nurse call cancel button.

An objective of the present invention has been to provide cabinetry at the head of the bed, termed the "head wall," to provide service facilities and service connections, but to conceal them when not required.

Another objective of the present invention has been to provide cabinetry for concealing such service and service connections wherein the cabinet does not provide an obstruction to a rising bed that is mounted close to the wall.

Still another objective of the present invention has been to provide the cabinetry referred to above in concert with a bed locator that is located adjacent the floor, the bed locator itself having certain service connections.

These objectives of the present invention are attained by providing a cabinet installed on the wall of the room at the head of the bed. The cabinet has a length substantially greater than its height. The cabinet includes two horizontally-spaced modules that are positioned about 48 inches apart. The modules protrude significantly from the wall and, between them, create a recess immediately above the bed through which the bed can pass when it is elevated.

The area of the recess is covered by a movable panel, the removable panel providing access to wiring and gas raceways by which the services are brought into the patient's room to their termination points in the modules. Preferably, the panel will be hinged to swing vertically or horizontally. Further, it is preferable that the panel is in the form of a picture frame permitting the artwork to be selected appropriate for the room decor.

The modules contain the services and service connections. These include gas outlets on either side, standard electrical 110 V outlets, emergency electrical outlets, blood pressure monitoring accessories, and a low voltage service for a nurse call unit and accessories for the nurse call. All of the foregoing services and service terminations are covered by tambour doors mounted in slides that permit the doors to slide behind the removable panel when the tambour doors are open to expose the service and service connections.

Horizontal upper and lower moldings are preferably provided across the head wall.

The modules also provide support for indirect lighting above the modules. A safety reading light is mounted behind the upper molding across the recess at the upper edge of the cabinet. The reading light could be in the path of an IV pole or traction equipment mounted at the head end of the bed, but the light is upwardly-movable and is provided with a limit switch adapted to cut off power to the bed when the bed is being raised as disclosed in U.S. Pat. No. 3,919,540. The lower molding can be upwardly-movable and connected by a limit switch to the bed power outlet. Indirect lighting, supported on the modules and behind the molding, is also provided.

The invention further provides a bed locator or dock consisting of two protuberances or bumpers between which the bed is positioned when the bed is brought into position adjacent the wall. The locator bumpers are positioned directly below respective modules so that when the bed is correctly positioned between the bumpers, the bed is centered below the recess between the modules. The protuberances forming the bed locator are provided with certain of the outlets and other terminations, including the power for the bed. Thus, the chase bringing the services to the modules, when extended downwardly, brings such services as are required to the protuberances of the bed locator.

The bed locator with its service connections enhances the flexibility of the whole system. For example, a power outlet for the bed is located in the bumper and the safety light limit switch is connected directly to it. Another example is the nurse call cord. The system of the invention could have three jacks for the cord, one within a module, one behind the lower molding on a module and one on a bumper.

In a further embodiment of the invention, a single head wall module also adapted to be mounted on the wall in a patient's room above the patient location is provided. This single module may be used conveniently in combination with the head wall described above including two horizontally-spaced modules, such as in maternity units where the larger, horizontally-spaced module head wall cabinet would be provided for the mother and the smaller, single module for the newborn. The smaller single module head wall, which may be on the order of 28 to 32 inches in width is useful where a lower level of patient care is required; and, therefore, fewer medical services are needed. Thus, for example, this single module head wall may provide medical gas outlets such as oxygen, air, nitrous oxide, or vacuum, a source of electrical power, a blood pressure monitoring device such as a sphygmomanometer, and provision for a nurse call unit. In accordance with the teachings and objectives of this invention, the medical services are recessed and located behind doors which are movable between an open position to expose and provide access to the medical services for the patient and a closed position where the services are hidden behind the doors thus providing the patient room with a more visually pleasing environment and one less sterile looking and threatening to the patient. In a presently preferred form of the invention, the doors are a pair of tambour doors which meet in the middle of the module and slide in tracks on either side of the module to open the module to expose the services. Thus, the appearance of the single-module head wall can be made to coordinate with the double-module head wall giving the patient room a look of overall integration of patient-service units.

Still further, the single module head wall may be used by itself, i.e., mounted on a patient room wall above the patient location without additional head wall modules where the level of desired patient care permits.

The several features and objectives of the present invention will become more readily apparent from the following detailed description taken in conjunction with the accompanying drawings in which:

FIG. 6, 6A and 6B is a disassembled, perspective view of the structure of FIG. 1.

Figure 1:
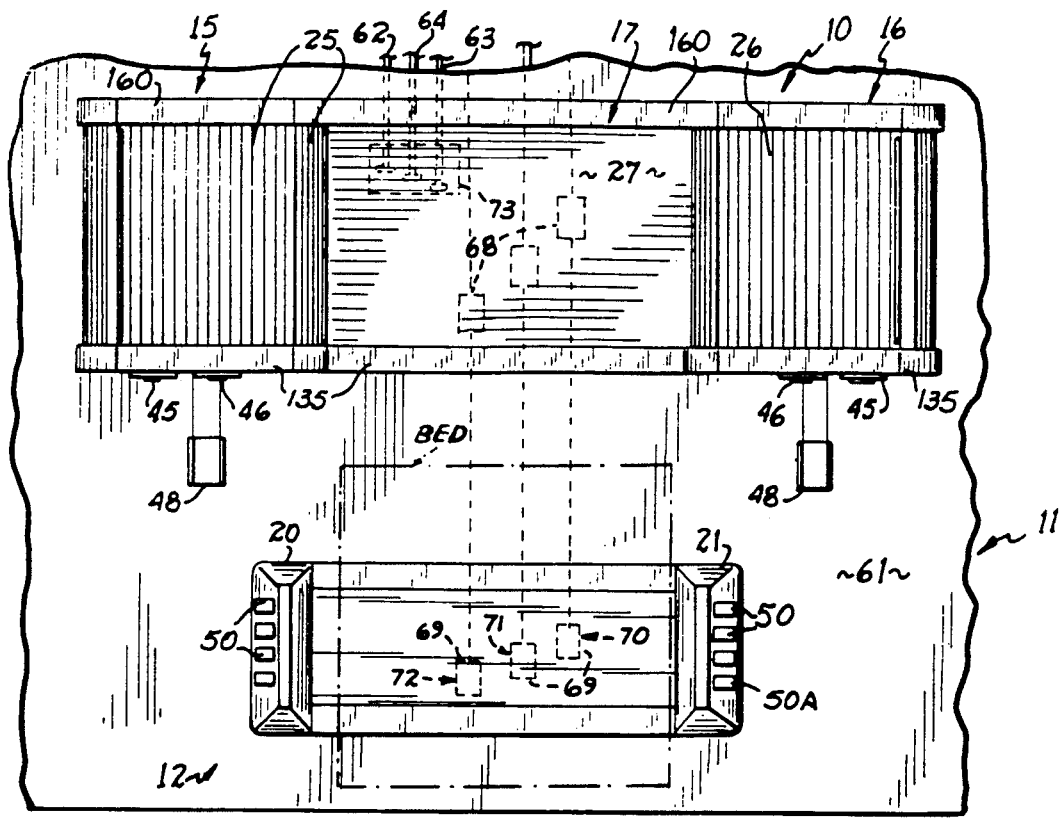
FIG. 1 is an elevational view of a room wall containing the head wall and bed locator.

Referring to FIG. 1, a head wall 10 is shown mounted on a room wall 11. It has a length about three times greater than its height and is mounted above a bed in the room. A bed locator 12 is located below the head wall. The head wall is formed by two modules 15 and 16 of substantially identical size that are spaced apart by a recessed center section 17. The length of the center section that spaces the two modules apart is about four feet. The head wall is mounted well above the hospital room floor to permit a bed to be positioned below it.

Below the head wall, the bed locator 12 is formed by two bumpers 20, 21 that are also spaced apart by about four feet. The bumpers preferably have a vertical dimension of approximately twenty inches so that they are adapted to receive and center the bed adjacent the wall regardless of whether the bed is in a raised or lowered position.

Figure 2:
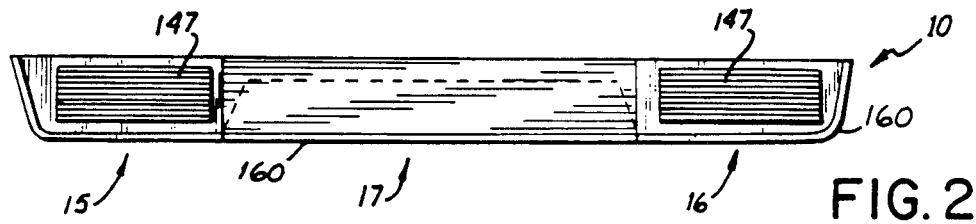
FIG. 2 is a top plan view of the head wall.
Figure 3:
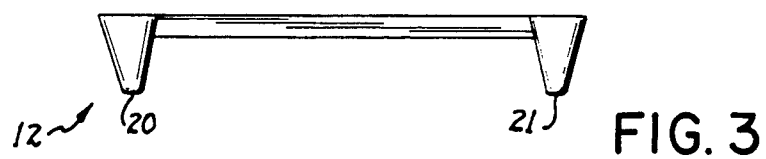
FIG. 3 is a top plan view of the bed locator.
Figure 4:
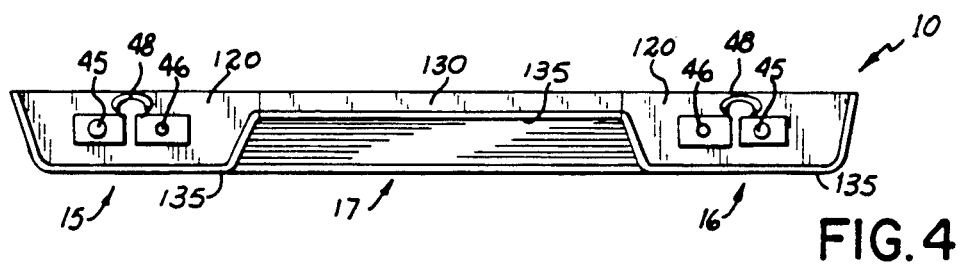
FIG. 4 is a bottom plan view of the head wall.

Indirect lighting fluorescent bulbs are mounted in the top of each module 15 and 16. Fluorescent down light bulbs are mounted in the upper part of the center section to provide reading lights for the patient. As shown in FIGS. 1 and 2, the modules 15 and 16 project from the room wall a distance of about six inches and contain within the space defined by the module electrical outlets, gas outlets, nurse call blood pressure measuring equipment and the like, as will be described below. As indicated by FIG. 1, all of this equipment is concealed by the tambour doors 25 and 26 covering the modules 15 and 16, respectively. The center section 17 contains horizontal raceways, to be described, that are normally covered by a center panel 27 that is adapted to be pivoted out of the way for access to the raceways.

Figure 5:
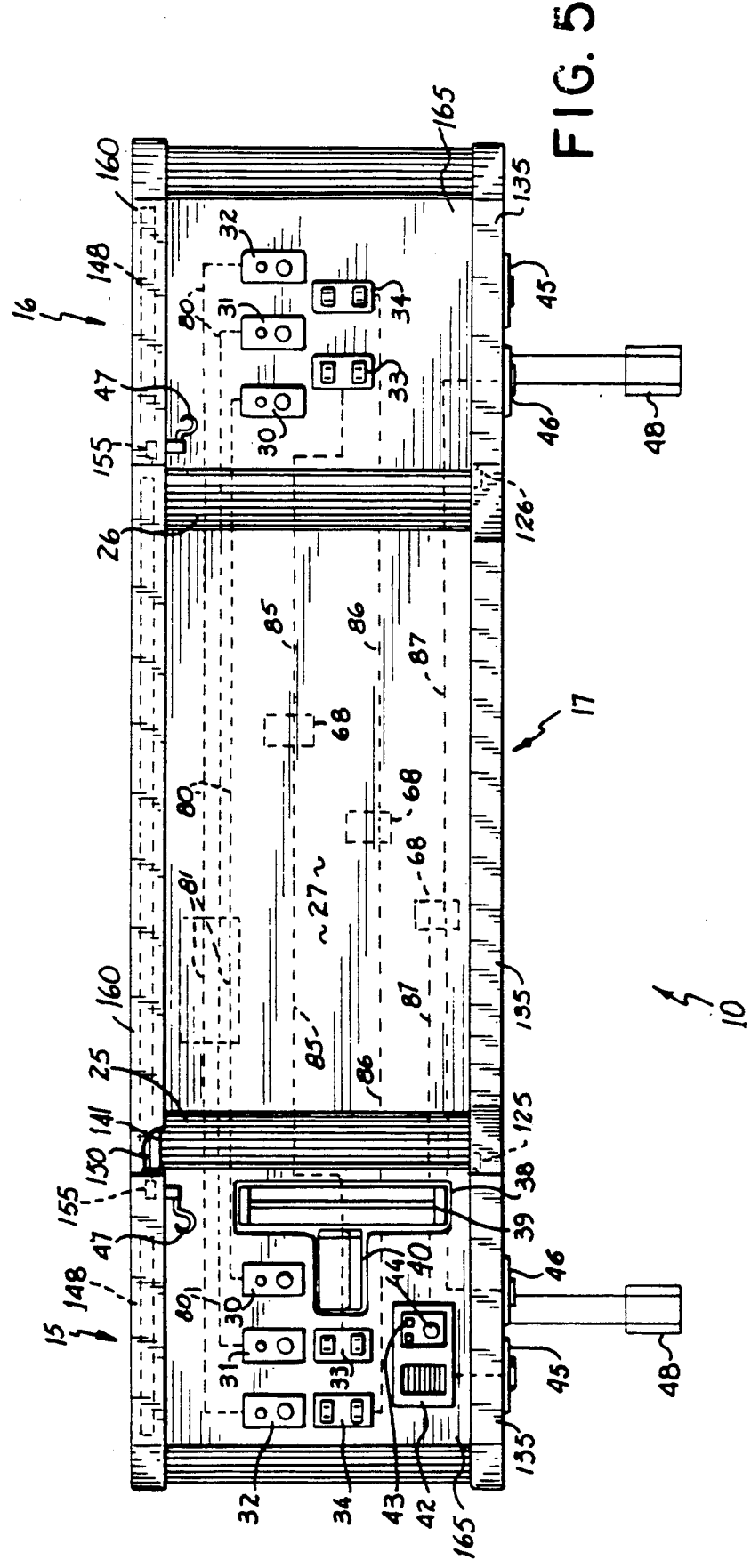
FIG. 5 is an elevational view of the head wall with the doors open.

Referring to FIG. 5, the tambour doors 25 and 26 have been slid on tracks into the center section and behind the panel 27. This sliding of the tambour doors exposes the operating elements of the head wall. With this combination, the patient entering the room would see the head wall with tambour doors overlying the modules 15 and 16, as shown in FIG. 1, thereby presenting no medical apparatus to give cause for alarm. When, however, it is necessary to use the equipment, it is immediately accessible simply by sliding the tambour doors 25 and 26 into a concealed position behind the center panel 27, as shown in FIG. 5. When the change is made, the patient probably would not be aware of the change of condition of the room since the head of the bed would be disposed immediately under the head wall 10.

Figure 6:
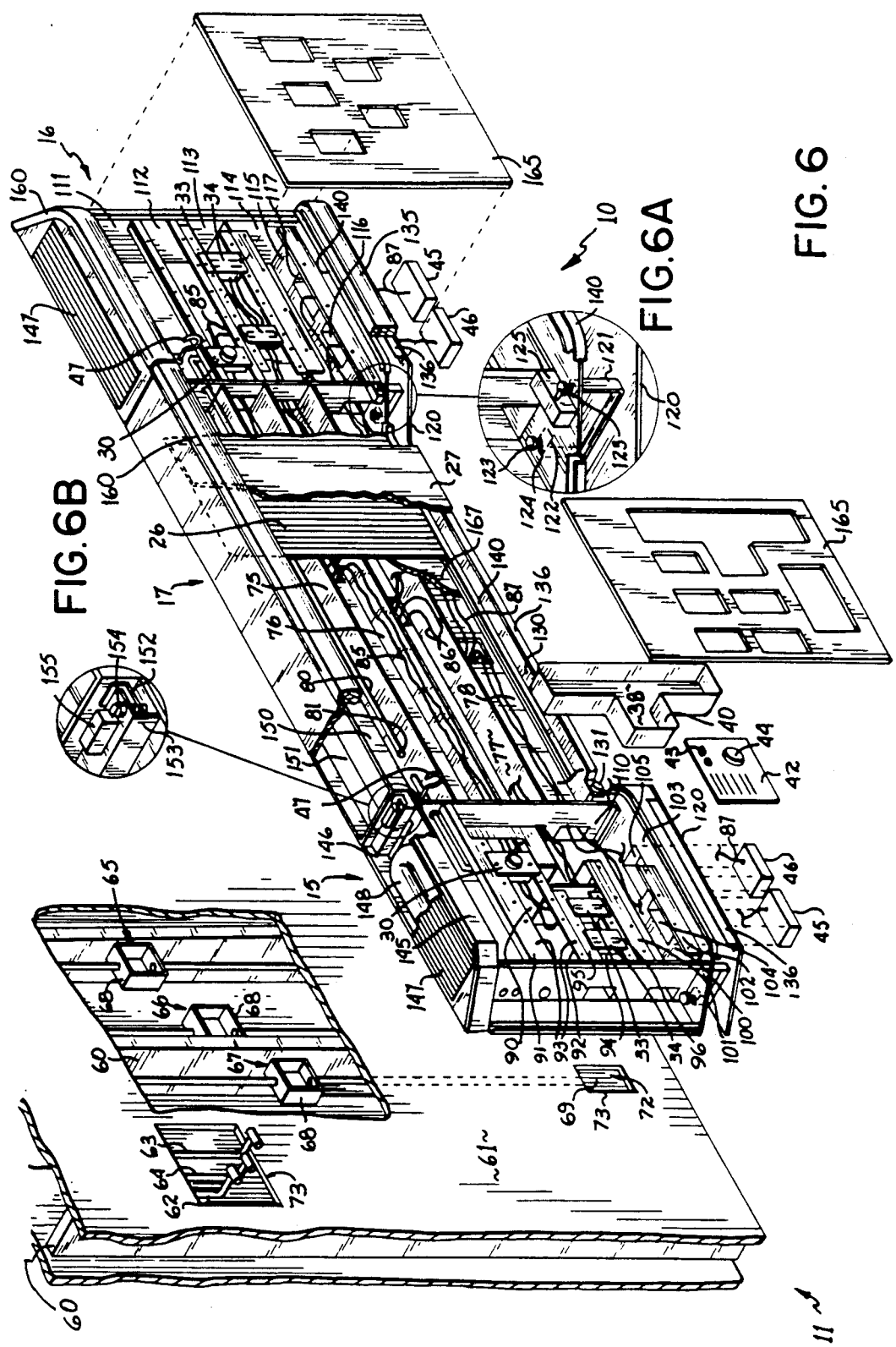

As will appear from the detailed description of the raceways and the compartments in the modules, the head wall is susceptible of a wide variety of different locations of the operating elements on the modules. Thus, the hospital architect has considerable leeway in the matter of designing the positioning of the operating elements to accommodate the customary procedures in the hospital. The arrangement of the elements shown in FIGS. 5 and 6 is thus illustrative only.

In the left module 15, three gas outlets are provided. Outlet 30 is for vacuum, outlet 31 is for oxygen and outlet 32 is for nitrous oxide. The named gases are of course illustrative, the hospital being able to designate the gases it wishes for its application. Below the gas outlets are electrical outlets. The outlet 34 is for 110 volts and outlet 33 normally colored red is connected to the emergency supply.

A molded T-shaped receptacle 38 is mounted in the module 15 to receive blood pressure monitoring equipment. A mercury manometer is shown at 39 and a cuff storage area is shown at 40.

At the lower part of the module 15 is a nurse call unit 42. The nurse call unit can be one of a variety of sizes and shapes. There are some rather large nurse call units that could be required to go in module 16. As will be seen, the module structure is designed to accommodate large or small call units. Each unit has a remote cancel button 43 and a receptacle 44 to receive a remote bed pendant control receptacle. The remote cancel button 43 is provided to enable the nurse to cancel, at bedside, the nurse call. This is preferred rather than having the call cancelled at the central nurse station, for it provides assurance that the patient will in fact have been attended to.

The remote bed pendant control (not shown in drawing) is a control instrument used by the patient for controlling the operation of a number of items such as the bed, television and nurse call.

On the underside of the module is a redundant remote cancel button 45 and a redundant receptacle 46 for the remote bed pendant control jack. By providing elements 45 and 46 on the underside of the module 15, the tambour doors 25, 26 can be closed with those items being fully operational.

The tambour doors may have a cluster of small openings overlying the speaker-microphone portion of the nurse call unit. These are formed by milling off a portion of the strips that form the door, thereby facilitating the passage of sound to and from the speaker microphone.

Module 15 also contains a pivotal hook 47 for receiving an IV solution. The hook can be swung out to an operative position or swung into the module, as shown, so that it can be covered by the tambour door when it is closed.

A bottle slide 48 is pivotally mounted on the lower surface of the module 15 so that it can be swung upwardly to lie in a concealed position against the lower surface of the module, or it can be swung down to a depending position, as shown, where it can be used to receive a vacuum bottle or other container.

The opposite module 16 has gas outlets 30, 31, and 32 identical to the gas outlets on module 15. The module 16 also has electrical outlets 33 and 34, outlet 33 being colored red as an emergency outlet. The lower part of the module 16 is adapted to receive a low voltage nurse call unit. None is shown since, in the illustrated arrangement, the nurse call unit is in module 15. The underside of the module is adapted to receive a remote cancel button 45, a remote bed pendant control receptacle 46 and a bottle slide 48. When a hospital room is designed, the architect will make the decision as to which side of the head wall should contain those elements and which of those elements will simply be duplicated on both sides. The invention provides those options.

An IV hook 47 is mounted in module 16 just as one is mounted in module 15 so that the IV can be administered from either side of the patient.

The bed locator 12 has, in each bumper 20 or 21, four electrical outlet positions 50. These can be used for standard 110 V supply, an emergency 110 V supply, a low voltage supply and a supply specifically designated for the operation of the bed. That supply indicated at 50(A) will normally supply 110 V to the bed motor. That supply is in a circuit with limit switches mounted on the modules as well as the down light, to be described below. The cooperative relationship between the outlet 50(a) and the limit switches is such as to interrupt the power to the bed when the bed or any accessory mounted on the bed strikes any lower portion of the head wall or strikes the down light in the center section 17. One of the bumpers 20 as well as one of the modules 15 and 16 may also have a receptacle for making an optional connection for a nurse call cord.

The construction of the head wall and its mounting on the hospital wall is best shown in FIG. 6. The hospital wall 11 is formed by a plurality of vertical studs 60 that are covered by dry wall 61. Between two of the studs are three tubes 62, 63 and 64 for the three gas supplies. The electrical supply is terminated at three upper outlets: 65 for 110 V emergency, outlet 66 for standard 110 V and outlet 67 for low voltage. The junction boxes 68 for those supplies are mounted in positions corresponding to positions on the center section of the head wall, as will be described.

Directly below the outlets 65, 66 and 67 are junction boxes 69 that contain terminations 70, 71 and 72 (FIG. 1) for the supplies 65, 66 and 67, respectively. These terminations are located behind the bed locator unit 12 and are adapted to be connected to the outlets on the bed locator unit.

A dry wall 61 covers the studs and has openings 73 aligned with the gas tube terminations and junction boxes to provide access to those elements. The head wall 10 is mounted on the room wall 11 overlying the openings 73.

The basic structure of the head wall is sheet metal configurated to form enclosed raceways in the center section and compartments in the modules. The center section has raceways 75, 76, 77 and 78. Raceway 75 contains left and right sets of three tubes 80 connected to the gas outlets 30, 31 and 32. The tubes 80 have, prior to installation, free ends 81 by which they can be connected to the gas terminations 62, 63 and 64, accessible through the opening 73 in the room wall. Raceway 76 has electrical wiring 85 that is connected to the emergency outlets 33. Raceway 77 has wiring 86 similar to the wiring 85 in raceway 76. The wiring 86 is connected to the conventional or standard 110 V outlets 34. Raceway 78 has wiring 87 that is connected to the low voltage system, principally the communication system, that is connected to the receptacle 44 of the nurse call unit 42. The low voltage system is also connected to the receptacle 46 and the remote cancel buttons 43 and 45 described above.

In module 15, there are walls forming a gas compartment 90, the walls including opposed vertical plates 91 and 92 in the front of the module. Those plates have a plurality of pre-drilled holes 93. The gas outlets 30, 31 and 32 are bolted to the plates 91 and 92, as shown in FIG. 6.

The module 15 has walls forming a compartment 94, the walls including front plates 95 and 96. The electrical outlets 33 and 34 are bolted to preformed holes in the plates 95 and 96, as shown.

The module 15 also has walls forming a compartment 100 including front plates 101 and 102. A nurse call unit is mounted by bolts to the front plates 101 and 102. The compartment 100 includes a bottom wall 103 having holes 104 and 105. The holes 104 and 105 are adapted to receive the cancel button 45 and the redundant jack 46 for the remote bed pendant control. Module 15 also includes a compartment 110 adapted to receive a molded T-shaped receptacle for the blood pressure unit. The compartment 110 will also receive an aneroid blood pressure unit.

Module 16 is similarly configured to provide an upper compartment 111 for gases, a compartment 112 for emergency electrical wiring and a compartment 113 for standard 110 V wiring and compartment 114 for low voltage wiring. The compartment 114 has a bottom wall 115 with cutouts 116 and 117 to receive remote bed pendant control receptacle 46 and redundant cancel button 45.

Each module has a lower horizontal plate 120 carried by U-shaped brackets 121 (see enlarged insert). The brackets have, at their upper ends, tabs 122 that are connected by bolts 123 to the bottom wall 103 of the module. Each bolt 123 is slidable in a hole 124 in the wall 103 and is loosely secured to the bracket 121 so that the bracket can move upwardly about ¼ inch. Limit switches 125 and 126 (FIG. 5) are carried on each side of the plate 120 and are adapted to be operated when the plate 120 is raised by about ¼ inch. The limit switches are connected to the power supply for the bed so as to interrupt the power supply to the bed when any of the limit switches is operated.

A plate 130 is mounted below the center section 17 and is upwardly movable. The plate 130 is pivotally connected at each end to a plate 120 by means of an elongated bolt 131. If either side of the plate 130 is raised, the plate will in turn raise one side of the plate 120, thereby closing the inboard limit switch 125 or 126 to interrupt the power to the bed. Thus, when the bed is raised, any contact by the bed or accessories mounted on the bed that engage the bottom plates 120 or 130 will prevent any damage to the head wall by interrupting the power to the bed.

Molding formed of wood trim strips 135 is bolted to flanges 136 on the plates 120 and 130 (see FIG. 6).

A lower tambour door track 140 is mounted on the bottom wall of the modules 15, 16 as well as the bottom wall of the center section 17. That track cooperates with a comparable track 141 (FIG. 5) on the top of the modules 15 and 16 as well as the top of the center section 17, thereby completing the support for the tambour door.

The top of each module has upwardly-turned flanges 145 forming an upwardly-facing compartment 146. Each compartment 146 has a socket and fluorescent bulb 148 connected to the 110 V supply. The compartment 146 is covered with a translucent member 147 to provide an indirect lighting fixture above each module.

Horizontal strips 150 form a downwardly-facing compartment 151 at the top of center section 17. The compartment 151 contains a pair of fluorescent bulbs and sockets to provide bed lighting for the patient. The ends of the compartment 151 have horizontal brackets 152 by which the compartment 151 is loosely bolted to L-shaped brackets 153 mounted on the top of each module (see enlarged insert). The bolts 154 that provide the mounting are adapted for vertical movement in the brackets 153 so that the compartment 151 can float vertically about ¼ inch. A limit switch 155 is mounted on each side on each module 15 and 16 adjacent the end of the compartment 151, the limit switch being actuated by the floating bolt 154 that contacts it when the compartment 151 is raised. The limit switches on each side are connected to the bed power outlet so as to interrupt the power to the bed when the limit switch is actuated. Thus, if the compartment 151 is struck by the bed or accessory, the power to the bed will be cut off. Upper molding (wood trim) 160 is secured to the forwardly-facing surface of the module compartments 146 and the compartment 151 to attractively conceal the metal work behind the moldings as well as the trackways for the tambour doors.

Each module is covered by a respective fascia plate 165, the fascia plate having cutouts tailored to the respective size, number and positioning of the gas outlets, electrical outlets and nurse control box.

The raceways 75–78 have a sheet metal cover 167 mounted to them. Overlying the cover 167 is the decorative panel 27 that is hinged to the compartment structure 151. The panel overlies the raceways 140 in the center section 17 so that the tambour doors can be slid behind the panel when the modules are opened up for access. The panel preferably is pivoted to one of the modules for horizontal swinging motion to open up the raceways. The panel of course may be plain; it could have a decorative scene painted on it, or it could have a backing and frame combination permitting the insertion of selected artwork.

In the operation of the invention, the head wall and bed locator are mounted on a wall above a bed as shown in FIG. 1. When a patient is installed in the hospital room, the tambour doors 25, 26 are preferably closed so that the patient has the feeling that he is in that type of comfortably appointed room for patients that have only a minor illness. All of the equipment to attend a much more critically ill patient is more immediately available behind the tambour doors. Should the need arise to use that equipment, it is immediately accessible simply by opening one or both tambour doors. Furthermore, outlets are available on either side of the bed to provide flexibility for the care of the patient.

Representative dimensions for the head wall are depicted in FIGS. 1 and 2. Beginning with the stated dimension of 48 inches between modules, the depicted length is about 98 inches, the height is about 31 inches and the depth that the modules project from the walls is about 10 inches.

Referring now to FIGS. 7–10, there is shown a further embodiment of the invention wherein the head wall 10 heretofore described is used in combination with a second, smaller head wall 170 to provide the patient's room with an array of optional services, it being understood that the head wall 170, as described below, may be used alone where the level of patient care so dictates. Thus, in a patient's or patients' room or ward, the larger head wall 10 may be mounted on the wall 11, including the bed locator 12, as described above, and further along the wall 11, a second smaller, single-module head wall 170 is mounted. The single-module head wall may have a horizontal width on the order of 28 to 30 inches, a height of 18 to 20 inches, and a depth of 6 to 8 inches.

Figure 8:
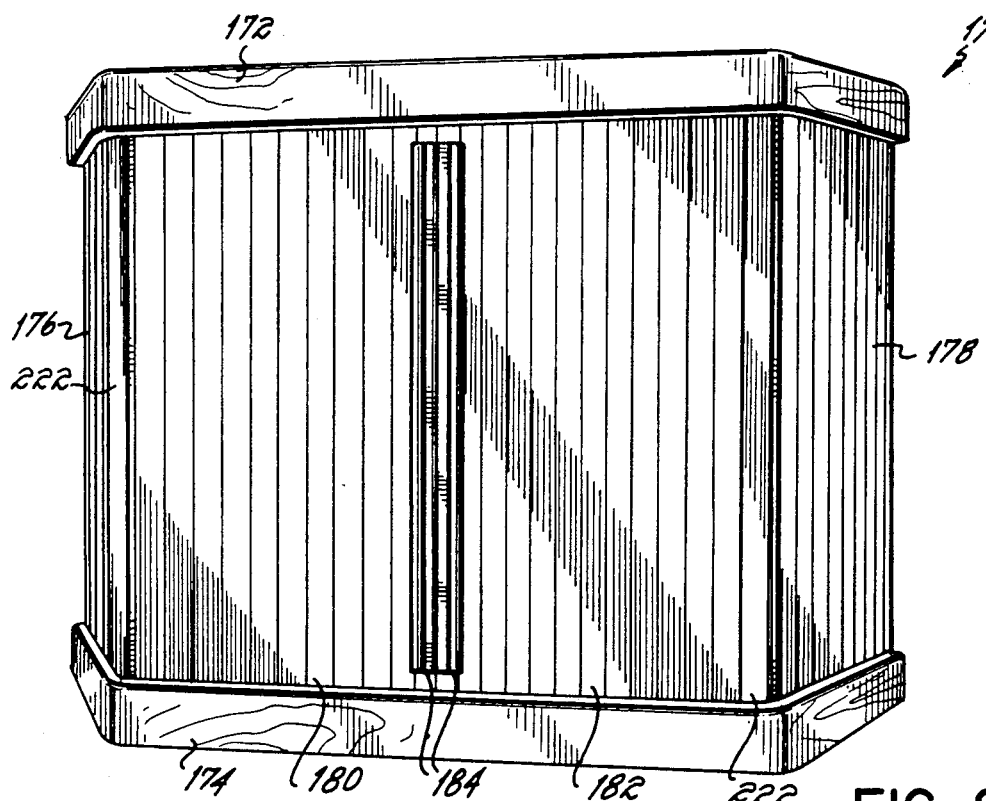
FIG. 8 is a front perspective view showing the single-module head wall seen in FIG. 7 with the doors closed.

As shown in FIG. 8, the head wall 170 includes a top or upper molding 172 and a bottom or lower molding 174, which may be in the form of decorative wood trim, left and right side walls 176 and 178, respectively, and door panels 180 and 182, respectively, which meet in the front to enclose the head wall. Vertical handles 184 on the door panels 180, 182 permit opening of the door panels to expose the medical services (FIG. 9).

Figure 7:
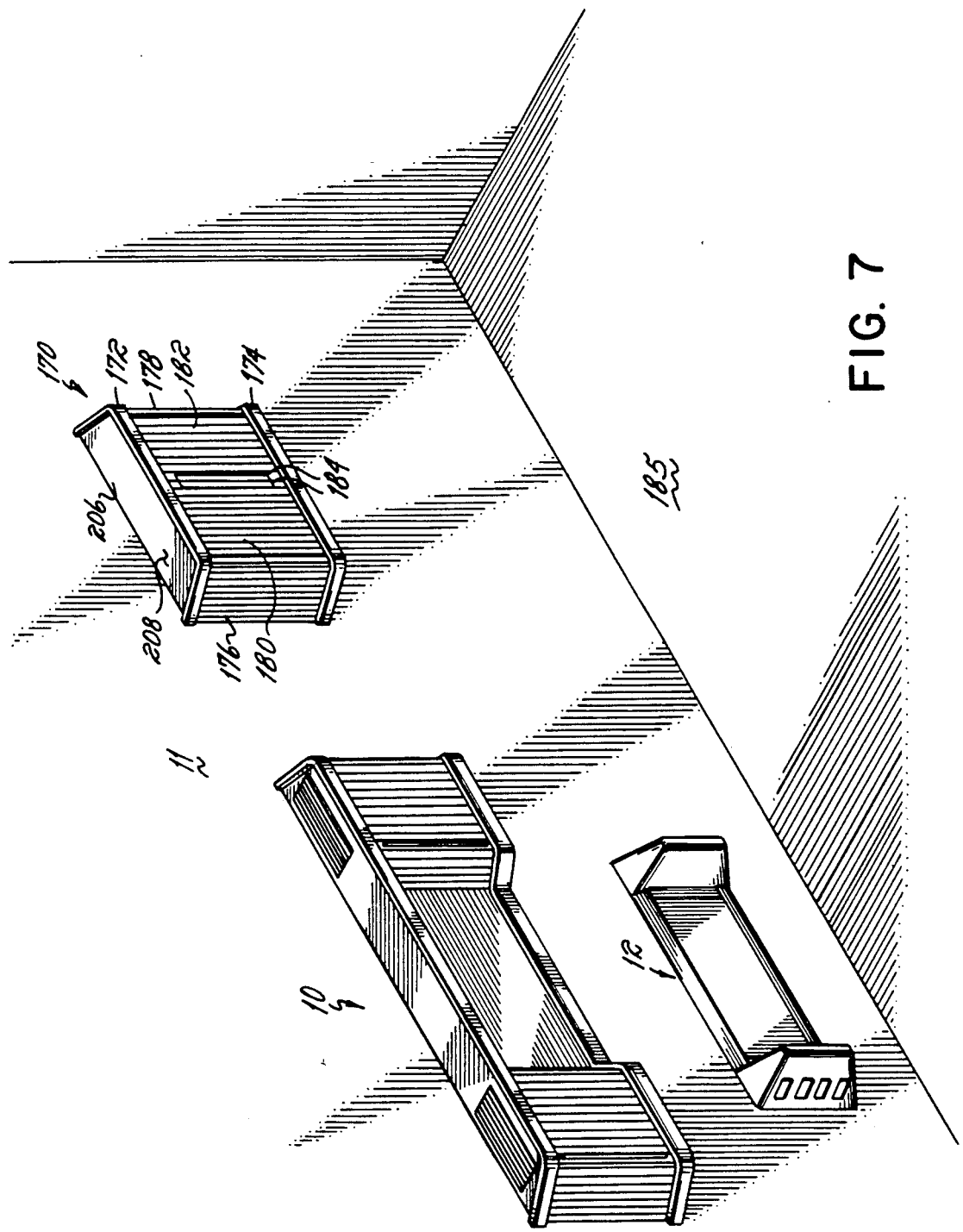
FIG. 7 is a perspective view showing a patient's room in accordance with the embodiment of the invention including the single-module head wall.

As shown in FIG. 7, the bottom molding 174 is horizontally disposed and located above the room floor 185 permitting the patient to be located therebelow.

Figure 9:
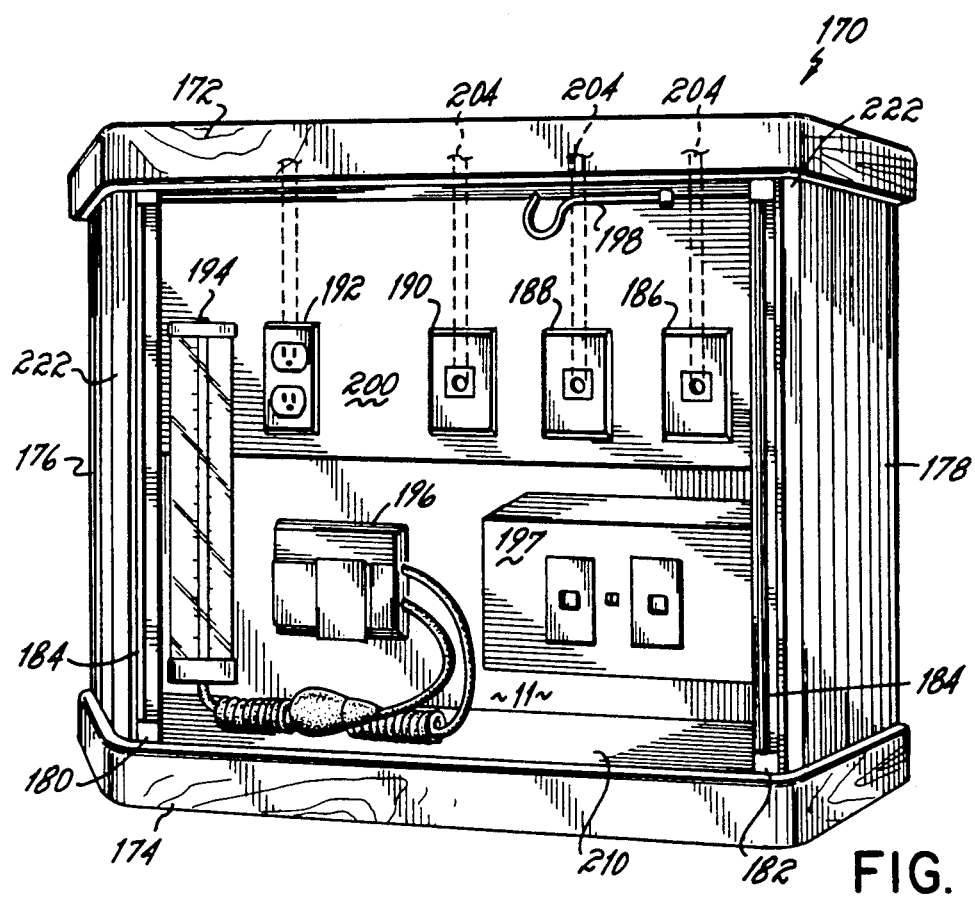
FIG. 9 is a view similar to FIG. 8 with the doors open to expose the medical services.

Referring now to FIG. 9, the head wall 170 conveniently is provided with medical service outlets and devices which may take a variety of arrangements as dictated by the particular environment in which the head wall is to be used. For purposes of illustration only, FIG. 9 shows three medical gas outlets, such as an outlet 186 for vacuum, an outlet 188 for oxygen, and an outlet 190 for air or nitrous oxide. These gases are of course illustrative, the hospital being able to designate the gases it wishes for its particular application. The head wall 170 also may include a duplex outlet 192 providing a source of electrical power, such as 110 volt power, it of course being understood that additional electrical outlets may also be provided. Provision is likewise made for blood pressure monitoring equipment such as a sphygmomanometer 196, and a box 197 for the mounting of a nurse call unit. A pivotal hook 198 may also be provided to be swung out to an operative position for receiving an IV solution and then swung back into the module as shown so that it can be covered by the tambour doors 180, 182 when closed (FIG. 8).

Figure 10:
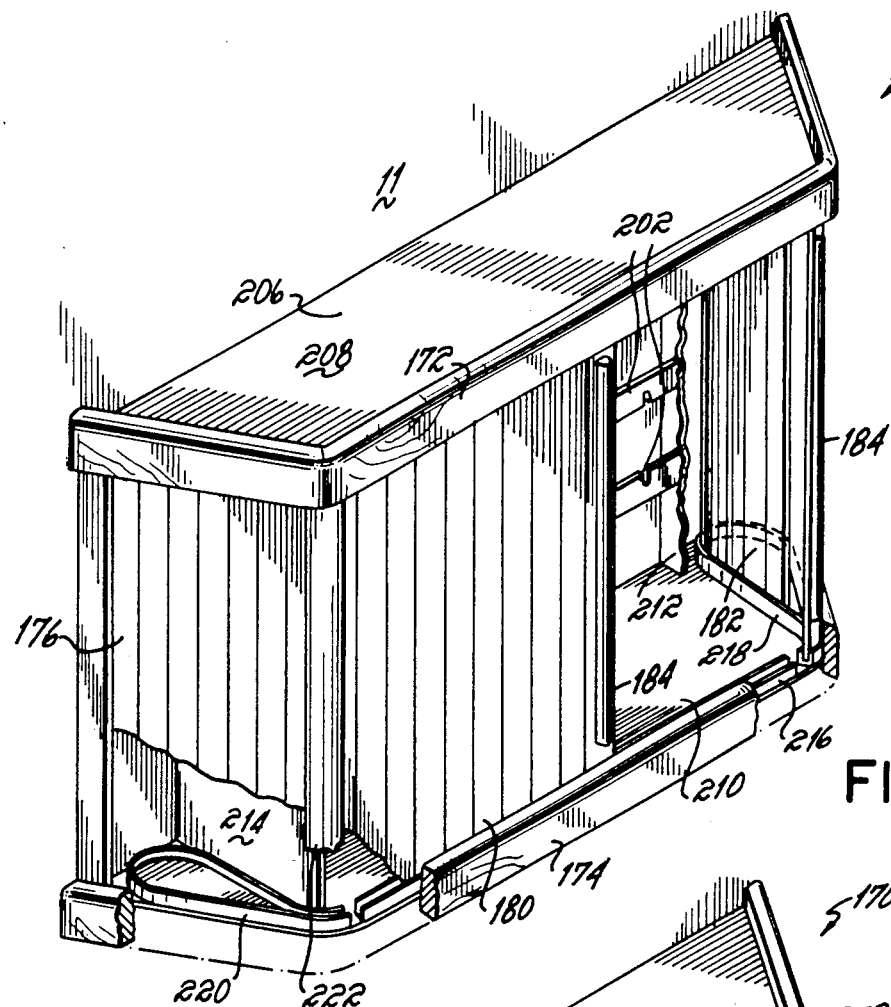
FIG. 10 is a perspective view of the head wall shown in FIGS. 8 and 9 with parts broken away to show the doors and arrangement.

The gas outlets 186, 188, 190, duplex outlet 192, and blood pressure monitoring 194, and nurse call 197 are recessed behind the doors 180, 182. The gas outlets 186, 188, 190, and duplex outlet 192 are mounted to a panel 200 located toward the rear of the head wall 170. As shown in FIG. 10, a pair of horizontal rails 202 extend from side-to-side. The rails 202 are spaced outwardly from the patient room wall 11 permitting gas piping 204 (shown in hidden lines in FIG. 9) to be brought downwardly along the wall 11 behind the outlets 186, 188 and 190 and the panel 200 to connect the gas outlets with the respective sources of gas. Likewise electrical wiring to connect the duplex outlet 192 to a source of electrical power is brought to the head wall 170 behind the panel 200. The top of the head wall 170 may include a recess 206 behind the top molding 172 permitting disposition of gas piping therein but concealed from view by the molding 172.

As further shown in FIG. 10, the head wall 170 includes a rigid metal frame. The frame includes a top panel 208 to which the top molding 172 attaches, a bottom panel 210 to which the bottom molding 174 attaches, and right and left side panels 212, 214. The horizontal mounting rails 202 extend between the side walls 212, 214. The top and bottom molding 172, 174 extend around the front of the unit hiding the top and bottom metal panels 208, 210. A track 216 for the tambour doors 180, 182 extends across the front of the unit behind the bottom molding 174. Track 216 connect at its ends with right and left curved track sections 218, 220 located, respectively, between the metal side panels 212, 214 and the outer side walls 178, 176. The track sections 218, 220 are likewise hidden from view by the bottom molding 174 and outer side walls 178, 176.

A like track (not shown) is mounted to the underside of the top panel 208 behind the top molding 172 only in inverted position to support movement of the doors 180, 182 at their tops. This track is hidden by the left and right decorative side panels 176, 178 which extend from a forward trim piece 222 back to the hospital wall 11. The side panels 176, 178 are fixed and have the same configuration as the tambour doors to provide a visually pleasing appearance to the patient's room. The tambour doors 180, 182 slide in the tracks meeting at the front of the unit to close the interior of the head wall from view and following the curved track path to open the head wall for access to the patient services. As seen best at the right side of FIG. 10, the curved track sections 218, 220 permit storage of the tambour doors in the head wall behind the side panels 176, 178, to provide a compact unit. The doors 180, 182 are sufficient articulated to permit their movement along the curved track path.

The module 170 may be provided with one or more limit switches to interrupt the power supply to a bed in proximity to the module 170 to prevent any damage to the head wall 170 by virtue of unintended contact by the bed accessories mounted on the bed when the bed is raised. In this connection, a lower horizontal plate may be mounted to the bottom of the head wall 170 in the same manner as described above with reference to plate 120 and as shown in FIG. 6A.

Figure 11:
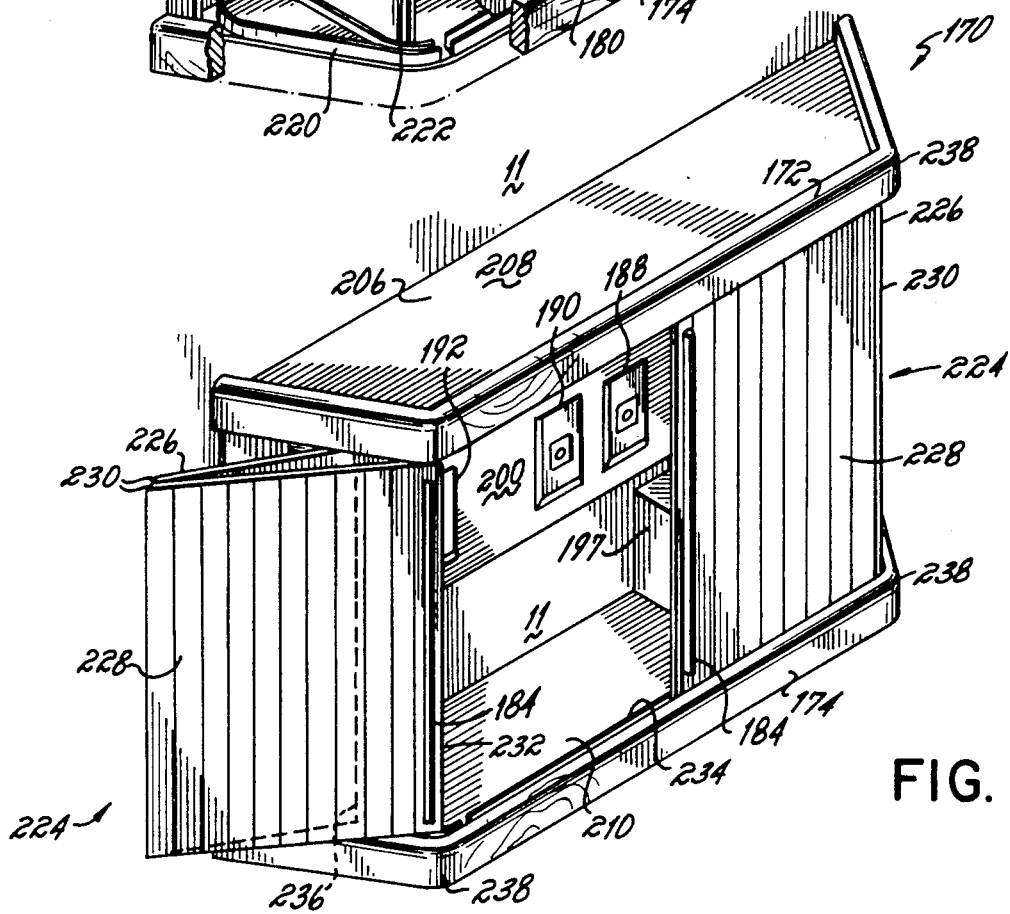
FIG. 11 is a perspective view of a single-module head wall with an alternative door configuration.

Referring now to FIG. 11, an alternative to the tambour doors is shown. In this embodiment, bi-fold doors 224 are provided which include respectively a side panel 226 and a front panel 228 which are hinged along abutting edges 230. The front edge 232 of the door 224 is mounted to slide in a track 234 extending across the front of the head wall, e.g., by means of pins in the door sliding in the track 234. Accordingly by grasping the handles 184 and moving them outwardly, the unit articulates about the hinge line 230, pivots on a vertical axis 236, and the front edge 232 of the door slides in the track 234 to provide access to the interior of the head wall. Likewise, by grasping the handles 184 and moving them together toward the center of the front of the unit, the unit can be closed with the hinge line 230 corresponding generally to the front corner 238 of the head wall. Although the tambour door arrangement is a presently preferred embodiment of the invention because of its compactness, another door arrangement has been described to illustrate that doors other than tambour doors may be employed if desired.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof.

We claim:

1. A head wall adapted to be mounted on a wall above a patient's bed location in a patient room comprising:

two horizontally spaced modules, said modules projecting outwardly from said wall and defining a recessed section therebetween, and containing a plurality of medical service outlets, said modules being spaced a distance sufficient to be disposed on either side of said patient's bed location and having a bottom edge adapted to be disposed above the height of said patient's bed in said patient room, said two horizontally spaced modules being joined together across said recessed section;

first door means for each said two horizontally spaced modules movable between an open position in which said medical service outlets are exposed and accessible for use, and a closed position in which said service outlets are concealed from view to provide a more visually pleasing environment;

a third module spaced horizontally in said patient room on said wall from said two horizontally spaced modules, said third module projecting outwardly from said wall and having a front, a top edge, and a bottom edge, and a recessed center section therebetween, said bottom edge being adapted to be disposed above a patient in said patient room;

a plurality of medical service outlets mounted in said recessed center section of said third module for providing medical services to said patient; and second door means mounted across said front of said third module between said top edge and said bottom edge and movable between an open position in which said plurality of medical service outlets in said third module are exposed and accessible for use and a closed position in which said plurality of medical service outlets in said third module are concealed from view to provide a more visually pleasing environment.

2. A head wall adapted to be mounted on a wall above patient's bed locations in a patient room comprising:

a pair of horizontally spaced modules, said modules projecting outwardly from said wall and defining a recessed center section therebetween joining said pair of spaced modules, each said module containing a first group of medical service outlets, said modules being spaced apart a distance sufficient to be disposed on either side of a first patient's bed location and having a bottom edge adapted to be disposed above the height of said patient's bed in said patient room;

a removable panel mounted between said pair of modules across said recessed center section;

a first set of tambour doors mounted across said modules and movable between an open position in which said first group of medical service outlets are exposed and accessible for use and a closed position in which said first group of medical service outlets are concealed from view to provide a more visually pleasing environment;

a third module spaced horizontally in said patient room on said wall from said pair of modules and projecting outwardly from said wall, said third module having a front, top edge, a bottom edge, and a recessed center section therebetween, said bottom edge also being adapted to be disposed above a patient in said patient room;

a second group of medical service outlets mounted in said recessed center section of said third module for providing medical services to said patient; and a second set of tambour doors mounted across the front of said third module between said top edge and said bottom edge and movable between an open position in which said second group of medical service outlets are exposed and accessible for use and a closed position in which said second group of medical outlets are concealed from view to provide a more visually pleasing environment.

3. The head wall of claim 2 wherein said first set of tambour doors slide behind said recessed center section in said open position to be concealed from view thereby.

4. The headwall as claimed in claim 2 further comprising horizontal branch raceways extending horizontally across said first recessed section between said pair of modules to deliver gas and electrical services to said first group of medical service outlets in said pair of spaced modules, and means for delivering medical services from a source to said second group of medical service outlets.

5. The headwall as claimed in claim 2 further comprising tracks for each of said first and second sets of tambour doors, said tambour doors being slidable in said tracks between said open positions and said closed positions.

6. The headwall as claimed in claim 5 further comprising a first horizontal molding across the bottom of said pair of spaced modules and a second horizontal molding across the bottom of said third module, said tracks being mounted behind said first and second horizontal molding, respectively.

7. A headwall adapted to be mounted on a wall above a patient's bed location in a patient room comprising:

a module projecting outwardly from said wall and having a front, horizontal molding extending across the top of the headwall, horizontal molding extending across the bottom of the headwall, side panels extending between the top and bottom molding, and a recessed center section therebetween, said bottom molding being adapted to be disposed above the height of said patient's bed in said patient room;

medical service outlets mounted in said recessed center section for providing medical services to said patient;

means for delivering medical services from a source to said medical service outlets;

tracks behind said top and bottom molding and said side panels; and tambour doors mounted in said tracks and movable between an open position in which said service outlets are exposed and accessible for use and a closed position in which said service outlets are concealed from view to provide a more visually pleasing environment;

said tracks having an arcuate configuration whereby in the door open position said tambour doors curve around on themselves and are concealed from view behind said side panels.

8. A head wall for a patient room comprising:

a rigid metal frame adapted to be hung on a wall above a patient's bed location in said patient room and comprising:

a top panel, a bottom panel, and left and right side panels extending therebetween and defining a recessed center section;

medical service outlets mounted in said recessed center section for providing medical services to said patient;

decorative top and bottom horizontal molding extending around said top and bottom panels;

decorative side panels extending between said top and bottom horizontal molding;

track means located between said decorative side panels and said left and right metal side panels; and tambour doors movable in said tracks behind said decorative side panels, said doors being movable between an open position in which said medical service outlets are exposed and accessible for use and a closed position across said recessed center section in which said service outlets are concealed from view to provide a more visually pleasing environment.

9. The head wall of claim 8 wherein said medical service outlets mounted in said recessed center section are spaced from said wall and wherein said head wall further comprises means for delivering medical services from a source to said medical service outlets.

10. A head wall adapted to be mounted on a wall above a patient's bed location in a patient room comprising:

a module projecting outwardly from said wall and having a front, horizontal molding extending across the top of the head wall, horizontal molding extending across the bottom of the head wall, side panels extending between the top and bottom molding, and a recessed center section therebetween, said bottom molding being adapted to be disposed above the height of said patient's bed in said patient room; said top and bottom horizontal moldings extending from said wall forwardly along the side panels and across the front of the head wall spaced forwardly from said recessed center section;

medical service outlets mounted in said recessed center section for providing medical services to said patients;

tracks behind said top and bottom horizontal moldings following the contour of said horizontal top and bottom moldings across said front of said head wall and back toward said wall at an angle to said front; and a door mounted in said tracks and movable between an open position in which said service outlets are exposed and accessible for use and a closed position in which said service outlets are concealed from view to provide a more visually pleasing environment.

11. A head wall for a patient room comprising:

a rigid metal frame adapted to be hung on a wall above a patient's bed location in said patient room and comprising:

a top panel, a bottom panel, and left and right side panels extending therebetween and defining a recessed center section;

medical service outlets mounted in said recessed center section for providing medical services to said patient;

decorative top and bottom horizontal molding extending around said top and bottom panels; said top and bottom horizontal molding extending from the rear of the frame forwardly along the left and right side panels and across the front of the head wall spaced forwardly from said recessed center section;

decorative side panels extending between said top and bottom horizontal molding;

track means located between said decorative side panels and said left and right side panels; and doors movable in said track means, said doors being movable between an open position in which said medical service outlets are exposed and accessible for use and a closed position across said recessed center section in which said service outlets are concealed from view to provide a more visually pleasing environment.

* * * * *